March 24, 1964  A. KNUTSSON  3,125,830
SEED STARTER DEVICE
Filed Oct. 17, 1961  2 Sheets-Sheet 2
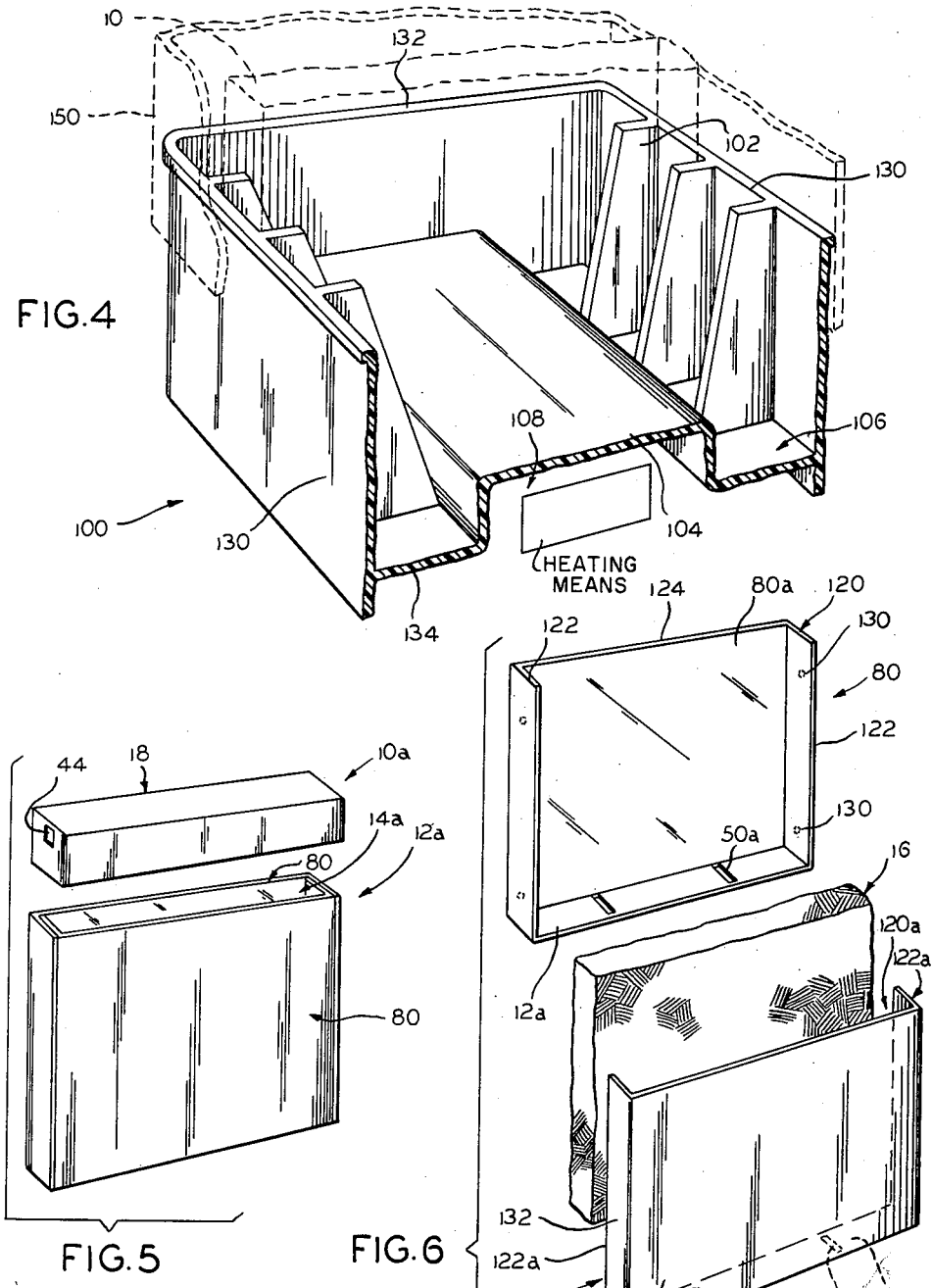
INVENTOR.
ARNE KNUTSSON
BY 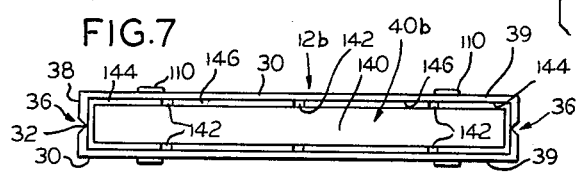
ATTORNEYS

United States Patent Office 3,125,830
Patented Mar. 24, 1964

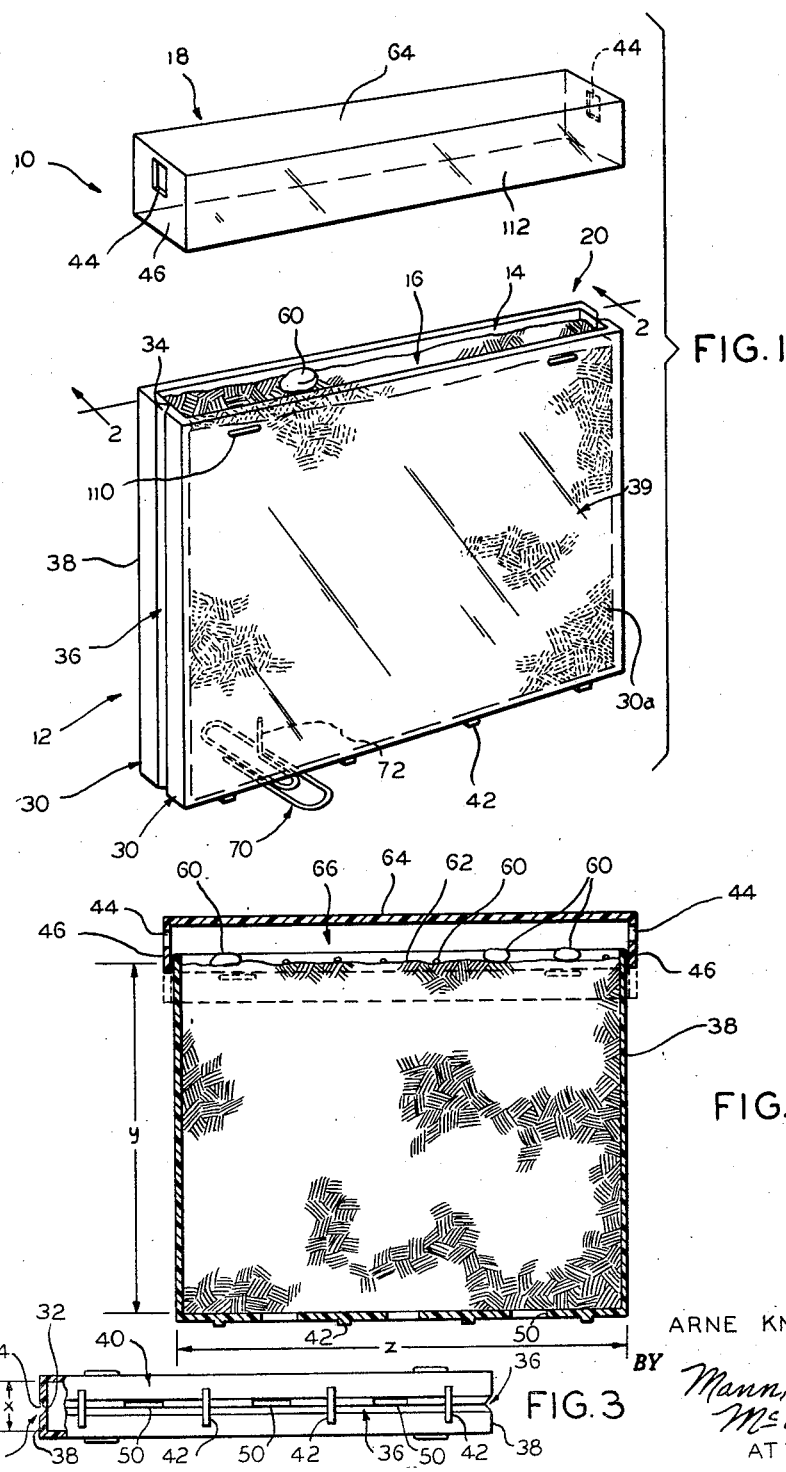

3,125,830
SEED STARTER DEVICE
Arne Knutsson, 322 Arbor Ave., West Chicago, Ill.
Filed Oct. 17, 1961, Ser. No. 145,703
5 Claims. (Cl. 47—37)

My invention relates to a device for starting seeds, and more particularly, to a device for germinating seeds under controlled conditions of temperature, aeration, and moisture, and facilitating the future handling of the resulting seedlings.

It has become common practice for the amateur gardener to start seeds of selected plants in trays or flats that are provided with a suitable growing medium (such as soil, peat moss, sand, vermiculite, or suitable mixtures of the same), similar to the way that professional growers start their seeds, but on a much smaller scale.

Conventional seed starting trays and flats, including those especially designed for use by the home gardener, customarily take the form of a pan or bowl-like container wherein the body of growing media is spread out substantially horizontally to provide in effect a miniature field in which the seeds to be started are planted.

The result is that many more seeds are planted and germinated than are actually needed, the growing space used is considerably larger than necessary, and the seedlings provided vary in quality due to poor control over moisture and temperature conditions. Furthermore, the subsequent handling of the seedlings after germination is frequently fatal to many of the more desirable seedlings due to the difficulty of separating their roots from those of adjacent seedlings and the growing medium.

Contrary to this customary practice, I have found that seeds may be readily started on or in a body of growing media that has a horizontal exposed surface of a width or breadth on the order of the thickness of the seed to be started.

A principal object of my invention is to provide a practical seed starting device that eliminates the waste and inconvenience of prior practices, and that makes it possible for the amateur gardener to germinate only the seeds he will ultimately plant in his garden, and even this under substantially controlled conditions of temperature, moisture and aeration.

Another important object of the invention is to provide a seed starter device that contemplates a vial or follicular-like growing media container or capsule providing a minute or modicum, but adequate, amount of growing media for seed germinating purposes.

Other objects of the invention are to provide a sheet-like seed starter that is to stand upright in its operative position; to provide a seed starter that permits the growth of all of the germinating seeds to be readily observed below as well as above the level of the growing medium; to provide a seed starter device that fully encloses the seeds and growing medium to satisfactorily control moisture, temperature and aeration conditions, but which is readily separable into segments in such a manner that the resulting seedlings are readily removed for transplanting purposes; to provide a seed starter device that provides ready merchandising of a seed-growing medium-seed starter unit which may be sold either with or without the seeds ready to start or with the seeds already germinated; and to provide a seed starter device that is economical of manufacture, convenient in use, and useable in connection with starting all types of seeds.

Other objects, uses and advantages will be obvious or become apparent from a consideration of the following detailed description and the application drawings.

In the drawings:

FIGURE 1 is a diagrammatic, partially exploded, perspective view illustrating one embodiment of my invention as disposed for receiving and germinating seeds, with the device cover displaced to partially expose the interior of the container, and illustrating one manner of supporting the container in its operative upright position;

FIGURE 2 is a diagrammatic cross-sectional view through the wide dimension of the container, substantially along line 2—2 of FIGURE 1;

FIGURE 3 is a bottom plan view, partially in section, of the container shown in FIGURES 1 and 2;

FIGURE 4 is a diagrammatic fragmental perspective view illustrating a tray I have provided for simultaneously mounting a number of devices of FIGURES 1-3 in their operative positions;

FIGURE 5 is a diagrammatic perspective view similar to that of FIGURE 1 but illustrating a modified form of the invention;

FIGURE 6 is an exploded perspective view of the container hopper of FIGURE 5, better illustrating the components thereof; and FIGURE 7 is a bottom plan view similar to that of FIGURE 3 but illustrating a further embodiment of the invention.

However, the specific drawing illustrations are provided primarily to satisfy the requirements of 35 U.S.C. 112, and it is to be understood that the invention may be embodied in other specific forms, as will be immediately apparent to those skilled in the art.

General Description

Reference numeral 10 of FIGURES 1 and 2 generally indicates a preferred embodiment of the seed starter arrangement contemplated by this invention, which is made up of a container 12 that defines a narrow elongate pocket 14, a quantity of growing media 16 received in and substantially filling said pocket 14, and a cover or lid 18 that is formed to be received over the open top 20 of the container 12.

Contrary to conventional miniature field type seed starter arrangements, the device 10 is in the form of a sheet-like receptacle or container that is to be disposed in a substantially vertical position when in use, and the pocket 14 that is defined by the container 12 should have a breadth transversely of the device corresponding to dimension $x$ of FIGURE 3 that is on the order of the thickness of the seeds to be germinated, or at least not greatly in excess of the thickness of the larger seeds encountered in the art of horticulture. However, the pocket 14 should have a depth adequate to permit the necessary seedling root growth, and growing media depths necessary for this purpose will exceed the breadth or thickness of the pocket 14 and its growing media 16 by a substantial amount.

Preferably, the device 10 assumes the flat shape illustrated to permit the application of a single row of seeds across the top of the growing media 16. However, devices 10 may take the form of a container and cover proportioned to define a pocket 14 that has a length and breadth (dimensions $x$ and $z$ of FIGURES 2 and 3), as distinguished from depth, which substantially approximates the thickness of the seed (with the depth being approximately as indicated in FIGURES 1 and 2).

Experience has shown that there is a critical relation between the lateral thickness or breadth of the pocket 14 and its contained growing media (the dimension $x$ of FIGURE 3) and the depth of the growing media (approximately the dimension $y$ of FIGURE 2), which if followed, will insure the provision of a fully adequate amount of growing media in spite of the fact that the dimension $x$ is on the order of the thickness of the seeds being germinated. This relation is that the dimension $y$ should exceed the dimension $x$ by a factor of approximately 2 or more, since the growing area taken up by the roots of the individual seedlings approaches this relation with respect to the seed thickness.

It will be found that when the principles of my invention are followed, the device 10 will have a size comparable to that of the conventional seed package envelope or a cigarette case. My preference on preferred specific dimensions for commercial forms of the invention is that the pocket 14 and the media 16 contained therein be from about 1 to 3 inches deep and have a dimension $x$ in the range of about 1/8 inch to about 1/2 inch. The dimension $z$ (see FIGURE 2) is optional, and will depend upon the number of seeds that the starter is to germinate; however, a convenient dimension $z$ is about 4 inches, since this will permit the simultaneous germination of about 12 of the larger size commercially available flower or vegetable seeds.

The preferred dimension range of $x$ that is indicated accommodates the full range of seed sizes (thickness) that are encountered in the art of horticulture, which includes minute size seeds such as begonia seeds (having a thickness on the order of a thousandth of an inch) and bean seeds, which have a thickness on the order of 3/8 of an inch.

Further in accordance with this invention, the container 12 is in the form of substantially identical pan-like halves or portions 30, which in the form of FIGURES 1–3 are integrally joined together by a thin web or fin 32 (see FIGURE 3) that extends entirely about the container at the inner portion 34 of tapering grooves 36 thereformed in the narrow sides 38 and bottom end 40 of container 12. In the form of FIGURES 1–3, the halves or portions 30 are also joined by spaced straps 42 that are applied in coplanar relation across the bottom 40 and are integrally united with the respective halves or portions 30.

Cover 18 is preferably proportioned to frictionally engage over the top 20 of container 12, and is imperforate except for vent openings 44 that should be formed in the side walls of the lid, as in the illustrated end walls 46.

Also, the lower end or bottom 40 of the container 12 is formed with one or more openings 50 that are to receive moisture when needed.

Further in accordance with this invention, the cover or lid is made from a substantially transparent material, as is one of the sides or portions 30 of container 12 (such as the portion marked 30a).

The device 10 is readied for use by filling pocket 14 substantially to the level indicated in FIGURE 2 (with respect to the open top 20) with a suitable growing media, such as a mixture composed of one-third sand, one-third peat, and one-third soil (humus or its equivalent). The growing media level indicated provides for expansion of the growing media when it becomes moisturized and provides a recess in which to place the seeds.

If the device 10 is being assembled on a mass production basis, suitable metering arrangements can be made available for applying the indicated amount of growing media 16 to pocket 14; however, the individual user can readily accomplish this himself where the device 10 is supplied without the growing media 16.

Presuming that the user has been supplied with a device 10 including growing media 16 and a cover 18, the device 10 is put into use by removing the cover 18 and then applying a suitable number of seeds 60 to the top surface 62 of the growing media. The cover 18 is then reapplied, but is positioned with respect to the container 12 somewhat as indicated in FIGURE 2 so as to dispose the vent openings 44 above the container narrow walls 38. This disposes the top 64 of the lid 18 well above the seeds 60 and positions the vent openings 44 to provide adequate aerating communication between the ambient atmosphere and the incubating chamber 66 that is defined by the cover 18, the container 12 and the growing media 16. The position of cover 18 can be set to suit conditions.

The device 10 is then placed in an upright position, substantially as suggested by FIGURE 1, in a pan or other receptacle having a flat bottom, wherein it rests on its straps 42, with the receptacle being supplied with sufficient water to cover bottom 40 of container 12, after which such pan or receptacle is placed on a convenient window sill or the like. Stability may be improved by applying a conventional paper clip 70 to the device, substantially in the manner indicated in FIGURE 1, wherein one leg 72 of the clip is bent at right angles to the plane of the clip at a point substantially adjacent the mid-dimension of the clip, and then inserted in one of the moisture openings 50.

This positioning of container 12 effects saturation of the growing media through openings 50 and by means of capillary action throughout the growing media itself. This is to be distinguished from conventional devices in which the growing media is watered from the top, which displaces the seeds and effects a leaching action on the nutrients in the growing medium tending to wash them away from the seeds.

Of course, the device 10 when used for seed germinating purposes should be placed in a well lighted area and maintained at room temperature during the germinating period.

The incubating chamber 66 established by the device 10 by its nature automatically provides the desired conditions of temperature, humidity, and aeration that are conducive to rapid germination. The cover 18 being transparent admits as well as contains the sun's radiant heat, and also keeps moisture evaporation rate at a minimum while at the same time providing ample aeration through the vent holes 44. Ordinarily, no further moisture other than that provided for the aforementioned wicking action of the growing media is necessary during the germinating period.

Since one of the container halves or portions 30 is transparent, for instance, the portion marked 30a, the condition of the individual seeds and the developing seedlings can at all times be readily observed both above and below the level of growing media 16. This not only permits determination of when additional water should be added, if required, but also provides an interesting display of the phenomenon of plant root growth, as the developing plant roots will be readily observable through the transparent portion of the container due to their juxtaposition with regard to the container wide sides 39.

As the seed sprouts rise from the individual seeds, the top or cover 18 may be further elevated and then removed.

When the seedlings have reached the desired growth stage, suitable for transplanting, the container halves 30 are separated by breaking the frangible web or fin 32 and straps 42 with a pen knife or the like. One of the container portions 30 may then be lifted off the underlying growing media 62 to expose the plant roots, and then the individual plants may be separated and transplanted as desired. Since the growing media breadth dimension (the dimension $x$) is not intended to greatly exceed the thickness of the larger seeds (for instance bean seeds) to be germinated by the device 10, it will be apparent that the growing media may be readily broken between the individual seedlings across the narrow dimension of the growing media to provide each seedling with what amounts to its own "ball" of earth, to keep its roots intact.

Alternately, after the seedlings have reached their desired growth stage, the bottom of the container 12 may be completely opened by employing a suitable knife or the like, and then the container 12 with its seedling and growing media contents may be planted as is in the ground. This induces the plant roots to grow down where moisture is more prevalent.

Referring now to the embodiment of FIGURES 5 and 6, these figures illustrate a device 10a which functions in the same manner as device 10 and includes the cover 18 of the device 10. However, in this form of the invention, the container 12a is in the form of the complementarily shaped halves 80, which as indicated in FIGURE 5 are arranged so that one half 80 fits into the other half. The halves 80 when assembled as shown in FIGURE 5 define a pocket 14a for growing media 16 both of which have the dimension characteristics already specified. The container halves 80 are both formed with moisture openings 50a that are respectively aligned to permit the passage of moisture in liquid form therethrough.

The device 10a is used in the same manner as the device 10 except that it is contemplated that there will be a frictional engagement between the container portions 80 so that they may be readily separated when it is desired to remove and transplant seedlings. Alternately, they may be held together by a rubber band or a piece of string.

While it is contemplated that the devices 10 and 10a will generally be used individually to start a small number of seeds, it sometimes will be convenient to use a number of the devices 10 and/or 10a to simultaneously start a larger number of, or several different kinds of, seeds. For this purpose, my invention contemplates the use of the holding tray 100 that is diagrammatically illustrated in FIGURE 4.

The holding tray 100 is provided with spaced pairs of bracing webs 102 that are arranged in coplanar relation, with the webs of each pair being spaced apart sufficiently to accommodate a device 10 or 10a, as indicated in dashed lines in FIGURE 4. The tray 100 preferably includes raised ridge 104 on which the devices 10 or 10a rest.

The container 100 thus defines troughs 106 on either side of ridge 104 in which water may be placed to improve moisture conditions. The ridge 104 defines a heating chamber 108 in which suitable electrical heating elements may be disposed to increase temperature conditions, if so desired.

It will therefore be seen that my invention contemplates a radical departure from the usual seed starter arrangement in that the seeds are applied to a comparatively thin upright layer of growing media, and in such a manner that the germination conducive conditions of temperature, moisture and aeration are fully controlled. Furthermore, progress of the germinating plant may be visually inspected from both above and below the top of the growing media.

This arrangement permits the individual gardener to start as few or as many seeds as he wishes under the best possible germinating conditions. All the seed and plant waste now associated with customary practices will be eliminated.

*Specific Description*

The containers 12 and 12a may be formed from any suitable materials, though at least one of the wide sides of the container should be transparent, as already indicated. In accordance with one commercial embodiment of the invention, the container halves or portions are formed from transparent polystyrene by employing a suitable injection molding process. However, the containers can be made from suitable plastic film, paper, paperboard, or metallic foil materials having the desired characteristics to provide the structural features indicated. A fine screening or netting material would also be suitable, particularly for use in place of the transparent portion of the container, though the netting mesh must be sufficiently fine to preclude too rapid moisture evaporation.

Similar remarks apply to the construction of the covers 18, though, as already indicated, the vent openings 44 preferably are in the side wall structure of the cover so that when the cover is moved to the lowermost dashed line position indicated in FIGURE 2, the vent openings are closed by the container side walls 38.

As has also been indicated, preferably there is a friction fit between the cover 18 and the container 12 or 12a. In the embodiment of FIGURE 1, the wide surfaces 39 of the container are provided with spaced ribs or protrusions 110 that are proportioned to frictionally engage the side walls 112 of the lid on either side of the container. However, in the embodiment of FIGURE 5, these ridges are omitted and the lid 18 is proportioned to directly frictionally receive the halves or portions 80 that define container 12a.

In the showing of FIGURES 1–3, it is assumed that cover 18 is sufficiently flexible to be pressed down over ribs 110 when so desired, but for seed starting purposes, the cover 18 may rest in engagement with ribs 110, as indicated in FIGURE 2.

The straps or bars 42 in practice should be as thin as possible to serve their intended purposes, they being 1/16 of an inch wide by 1/32 of an inch thick in a commercial embodiment of the invention.

In the embodiments of FIGURES 5 and 6, the outer container half 80 is provided with an open top 120, narrow side walls 122, relatively wide side walls 124, and bottom wall 126 in which the openings 50a are formed. The inner container portion 80 includes similar structural features as indicated at 120a, 122a, 124a and 126a. In this embodiment of the invention, the side walls 122 of the larger portion 80 are formed with inwardly projecting protuberances 130 adapted for frictional engagement with the exterior surfaces 132 of the respective side walls 122a of the inner container portion 80. One of the container portions 80 may be transparent, such as that portion marked 80a, while the other portion may be opaque and bear labeling providing appropriate operating instructions and the like.

FIGURE 7 illustrates a modification of the embodiment of FIGURES 1–3 wherein bottom 40b takes the form of a panel 140 integrally united to container portions 30 by straps 142, but otherwise separated from such portions 30 by narrow end openings 144 and narrow center openings 146 that are proportioned to prevent the growing media from falling through them. This arrangement facilitates opening of the container bottom where desired as straps 142 may be easily severed with a pen knife. The device of FIGURE 7 may be used and supported in the same manner as already described.

The tray 100 may be formed from any suitable materials, though in a commercial embodiment it is made from transparent polystyrene by suitable injection molding process. While only one end of the tray 100 is shown in FIGURE 4, it may be assumed that the other end is identical, and the tray includes side walls 130 which merge into end walls 132, they both being integrally united with a bottom wall 134 and shaped to define the ridge 104 and the troughs 106. The respective bracing webs 102 are preferably integrally united with the side walls and bottom wall and have the tapering shapes indicated for appropriate bracing purposes.

The pairs of bracing webs 102 define dividing partitions between which the individual devices 10 or 10a may be placed. Of course, the tray 100 may be formed to have any appropriate or desired number of such dividing partitions. After the devices 10 or 10a are appropriately positioned in the tray 100, they may be covered by a transparent top indicated fragmentally in dashed lines at 150 to form what amounts to a greenhouse over the seed starter devices.

*Distinguishing Characteristics of the Invention*

It will now be clear that my invention is a radical departure from conventional seed starter practice. Instead of employing the miniature field-type approach, my seed starter arrangement contemplates the use of a thin vertically disposed slice or layer of growing media on which the individual seeds are placed. Preferably, this layer has a thickness on the order of the larger type common flower seed being germinated, and has a depth that exceeds the thickness by a factor of approximately two or more to provide an adequate root growing space.

My invention thus permits capsulized seed starter arrangements having vial or follicular characteristics in that they in effect define a pocket or crevice of minimum size in which the growing media is disposed together with the seeds to be germinated. When the growing media is moistened in the manner indicated and the device cover applied to the container, excellent germinating conducive conditions are insured and maintained for the time it takes seeds to germinate in a manner that prevent leaching of nutrients away from the seeds by excess watering. This necessarily eliminates most of the guess work that has been heretofore involved in seed starting, particularly in view of the fact that in accordance with my invention, the condition of the seed, both above and below the level of the growing media, may be readily observed.

After the seedlings have reached their desired growth, the growing media is readily reached and the plants separated for further transplanting.

The devices 10 or 10a may be sold as individual seed germinating units including the growing media. The large area of contact between the container side walls and the growing media insures that the growing media is firmly held in place against dislodgement, and this adapts these devices for use in supplying germinated seeds. Thus, the seeds may be applied to the individual containers, then germinated, and subsequently shipped while their growth is in a stage that will not cause interference between the plant leaves and the device tops.

Alternately, the devices 10 or 10a may be used to package seeds, with instructions being provided regarding the manner of applying an appropriate growing media to the container for seed starting purposes. In such instances, these devices can be sold and distributed through the same sources that conventional seed envelopes of the same size are handled.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. A device for germinating a single row of garden seeds, said device comprising:
   a flat planar, sheet-like parallelepiped container defining a bottom wall on which said container rests, a front wall, a rear wall, opposed side walls separating said front and rear walls, and an open top,
   said front, rear, and side walls being upright when said container rests on said bottom wall.
   said side and bottom walls spacing said front and rear walls from each other a distance that does not exceed approximately one-half inch,
   said front, rear and side walls being of uniform thickness and having a height that exceeds said distance by a factor that is at least equal to approximately two,
   said front and rear walls having a dimension longitudinally of said bottom wall that at least approximates the dimension of said height,
   whereby said front and rear walls form the wide sides of the container,
   and said side walls form the narrow sides of the container,
   said container thereby defining a planar, upright, elongate sheet-like pocket having a depth that substantially exceeds the pocket dimension that is defined by said distance,
   said container comprising a pair of separable pan-like portions releasably secured together along said side walls,
   one of said wide sides being transparent,
   said pocket being substantially filled with a growing media,
   said bottom wall being formed with openings therethrough for watering said growing media from the bottom thereof,
   and a cover for closing said container top,
   said cover comprising:
   a transparent parallelepipedly shaped element proportioned to frictionally receive the upper end of said container and defining an imperforate cover top wall, and imperforate cover end walls, an imperforate cover front wall and an imperforate cover rear wall proportioned to complementarily overlie the respective front, rear, and side walls of said container,
   said cover side walls each defining a vent opening spaced from the bottom of said cover and adjacent the top wall thereof,
   whereby, said cover may be pressed downwardly onto said container in closing said container top to close said vents by disposing said container side walls across same,
   and whereby said cover may be disposed on said top with said vents opened by positioning said container top within the portion of said cover below said vents to provide ventilation for a row of seeds when placed in said container on top of said growing media.
2. The device set forth in claim 1 wherein:
   said separable portions are secured together by a frangible web that integrally unites them.
3. The device set forth in claim 1 including:
   spaced strap elements fixed between said container portions across and below the bottom of the container,
   said strap elements being arranged in coplanar relation and defining a supporting base for the container.
4. The device set forth in claim 1 wherein:
   one of said container portions is proportioned to receive the other of said container portions with the portions thereof defining said container side walls and bottom wall being in frictional engagement.
5. The device set forth in claim 1 including:
   a plurality of seeds applied to the top of said growing media, with said seeds being substantially of the same size and arranged in a single row extending between said container side walls,
   said distance spacing provided by said container side walls between said container front and rear walls being substantially equal to the thickness of said seeds.

References Cited in the file of this patent
UNITED STATES PATENTS

| | | |
|---|---|---|
| 879,769 | Hight | Feb. 18, 1908 |
| 1,474,753 | Zrebic | Nov. 20, 1923 |
| 1,865,960 | Regelson | July 5, 1932 |
| 1,959,139 | Otwell | May 15, 1934 |
| 1,989,403 | Dauernheim | Jan. 29, 1935 |
| 2,083,571 | Levandowsky | June 15, 1937 |
| 2,211,445 | Tiedjens | Aug. 13, 1940 |
| 2,318,711 | Phelan | May 11, 1943 |
| 2,720,725 | Peerless | Oct. 18, 1955 |
| 2,879,627 | Hollander | Mar. 31, 1959 |
| 3,009,291 | Blackmore | Nov. 21, 1961 |